United States Patent
Walters et al.

(10) Patent No.: US 7,828,209 B2
(45) Date of Patent: Nov. 9, 2010

(54) ELECTRONIC PAYMENT TERMINAL DIAGNOSTICS

(75) Inventors: Paul Walters, Scottsdale, AZ (US);
Gregory Boardman, Laveen, AZ (US);
Robert D. Martin, Anthem, AZ (US)

(73) Assignee: Hypercom Corporation, Scottsdale, AZ (US)

( * ) Notice: Subject to any disclaimer, the term of this patent is extended or adjusted under 35 U.S.C. 154(b) by 846 days.

(21) Appl. No.: 11/562,739

(22) Filed: Nov. 22, 2006

(65) Prior Publication Data

US 2007/0242612 A1 Oct. 18, 2007

Related U.S. Application Data

(60) Provisional application No. 60/597,332, filed on Nov. 23, 2005.

(51) Int. Cl.
*G06K 15/00* (2006.01)
(52) U.S. Cl. .................. 235/383; 235/376; 714/57; 714/712; 714/716; 709/251; 709/246; 370/397; 370/401; 370/223
(58) Field of Classification Search .......... 235/383, 235/376; 714/57, 712, 716; 709/251, 246; 370/397, 401, 223
See application file for complete search history.

(56) References Cited

U.S. PATENT DOCUMENTS

| | | | |
|---|---|---|---|
| 6,031,528 A | 2/2000 | Langfahl, Jr. | |
| 6,414,958 B1 * | 7/2002 | Specht | 370/395.53 |
| 6,446,192 B1 | 9/2002 | Narasimhan et al. | |
| 6,606,602 B1 | 8/2003 | Kolls | |
| 6,606,605 B1 | 8/2003 | Kolls | |
| 6,609,102 B2 | 8/2003 | Kolls | |
| 6,647,430 B1 * | 11/2003 | Minyard et al. | 709/251 |
| 6,763,336 B1 | 7/2004 | Kolls | |
| 6,847,393 B2 | 1/2005 | Ashe et al. | |
| 7,269,129 B2 * | 9/2007 | Yasuo et al. | 370/217 |
| 2002/0040453 A1 * | 4/2002 | Oh | 714/712 |
| 2003/0187985 A1 | 10/2003 | Rohling et al. | |
| 2003/0195653 A1 | 10/2003 | Lewis et al. | |
| 2004/0160895 A1 * | 8/2004 | Holmgren et al. | 370/223 |
| 2004/0193918 A1 | 9/2004 | Green et al. | |
| 2005/0060598 A1 | 3/2005 | Klotz et al. | |
| 2007/0050303 A1 * | 3/2007 | Schroeder et al. | 705/67 |
| 2009/0013222 A1 * | 1/2009 | Di Luoffo et al. | 714/57 |
| 2009/0145958 A1 * | 6/2009 | Stoutenburg et al. | 235/376 |

FOREIGN PATENT DOCUMENTS

WO 0074313 12/2000

OTHER PUBLICATIONS

Examination Report for corresponding Australian Patent Application No. 2006330804, issued Sep. 1, 2009, 2 pages.
Supplementary Search Report for corresponding European Patent Application No. 06848875, issued May 7, 2010, 3 pages.

* cited by examiner

*Primary Examiner*—Allyson N Trail
(74) *Attorney, Agent, or Firm*—Snell & Wilmer, LLP

(57) ABSTRACT

The 'IP Diagnostics' software is a new and innovative method of aiding the deployment and troubleshooting of IP enabled POS terminals. Its purpose is to identify where a failure in the IP connection is occurring. The IP Diagnostics application does this by testing major failure points within the IP chain from the POS terminal to the host.

5 Claims, 2 Drawing Sheets

ELECTRONIC PAYMENT TERMINAL DIAGNOSTICS

CROSS-REFERENCE TO RELATED APPLICATION

Figure 1:
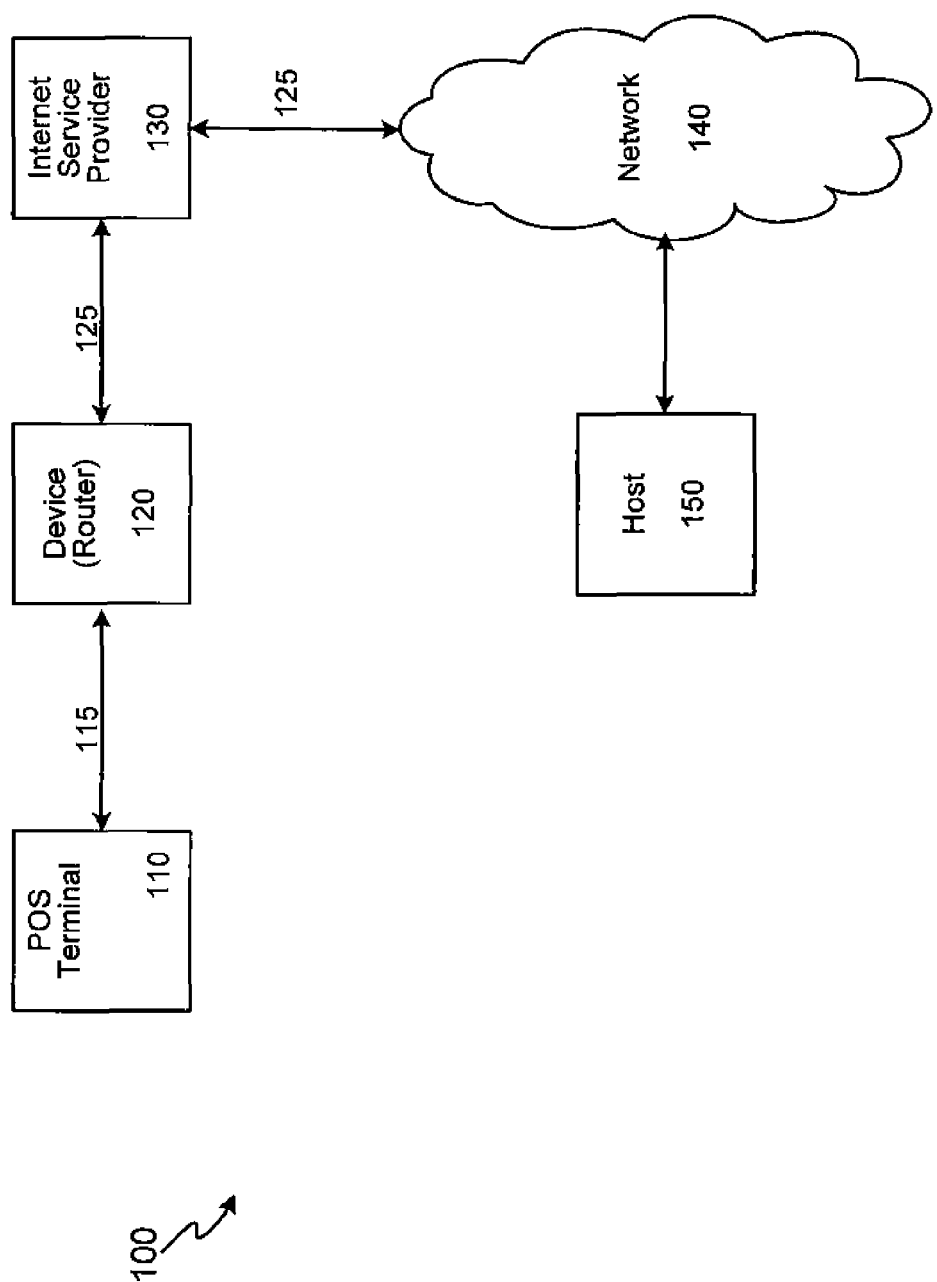

This Application claims priority to and the benefit of U.S. Provisional Patent Application No. 60/597,332 which was filed on Nov. 23, 2005 and entitled "POS Payment Terminal Diagnostics."

FIELD OF THE INVENTION

The present invention relates, generally, to an electronic transaction terminal that connects to a central computer using an Internet Protocol (IP) connection.

BACKGROUND OF THE INVENTION

Point of sale ("POS") terminals enable convenient electronic payment for many products and services. Consumers holding cards associated with a charge, credit, debit, or loyalty account may pay for a purchase simply by entering a card or card information directly into the POS terminal. The demonstrated success of "pay at the pump" terminals is just one example of the popular acceptance of and preference for the convenience of POS terminal transactions. Smart card and contactless card readers provide additional convenience at such POS terminals.

Presently known POS terminals typically include, inter alia, a magnetic stripe reader, a keypad for entry of a personal identification number ("PIN"), and a user display. Conventional POS terminals communicate either directly or indirectly with a central computer to authorize and settle sales transactions. Terminals often include either integrated or peripheral devices such as printers, bar code readers or PIN entry pads.

POS terminals often use Internet Protocol (IP) to connect or communicate with a central computer. When IP POS terminals are being deployed, or develop a problem while in the field, it is very difficult to identify where the problem is in the various points of the communication. The merchant is not knowledgeable in IP infrastructure topology and cannot even begin to tell what is going wrong. All the merchant knows is they cannot accept card payments and the terminal appears to not be working, and therefore, their business is suffering as a result.

Often the distributor of the POS terminal is a financial transaction processor that maintains a 'help desk' that merchants may contact when the POS terminal does not function properly. IP POS terminals create a significantly larger call volume to the help desk than conventional POS terminals, and help desk personnel are not trained, nor are they able to diagnose a problem with an IP terminal over the telephone.

Some manufacturers of POS terminals use a 'PING' or 'traceroute' method of looking for an error point in IP communications. This approach has numerous problems and limitations. Problems with this method include, many firewalls block ICMP echo request messages, which is the protocol used for PING and traceroute. This means this method will not be reliable or even usable in many installations. Secondly, even when this method shows a problem is happening, it does not show where the problem is, nor does it target any specific failure points.

As a result of this situation, in order to make a more attractive product, and provide an improved solution for an IP enabled POS terminal, and to lower the support costs associated with IP POS terminals, a novel and non-obvious IP diagnostics approach for POS terminals is described below.

BRIEF DESCRIPTION THE DRAWINGS

Figure 2:
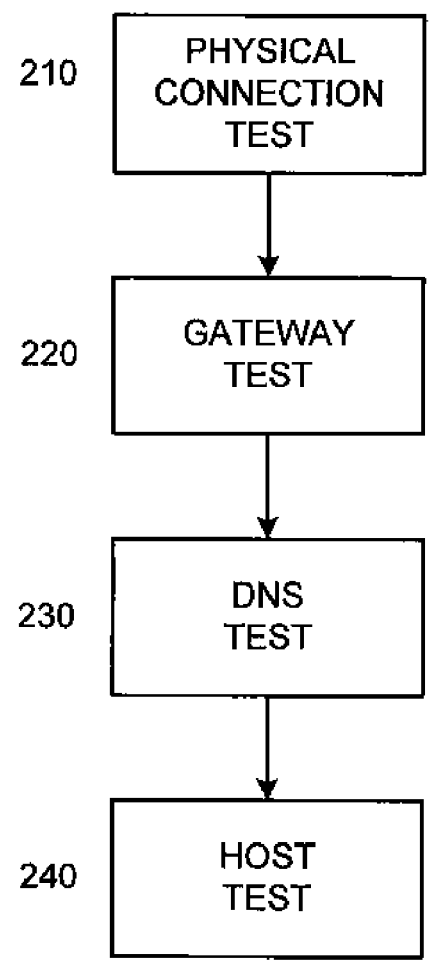

Additional aspects of the present invention will become evident upon reviewing the non-limiting embodiments described in the specification and the claims taken in conjunction with the accompanying figures, wherein like reference numerals denote like elements, and:

FIG. 1 illustrates a block diagram of an exemplary system in accordance with an embodiment of the present invention; and FIG. 2 illustrates a flow chart of an exemplary process in accordance with an embodiment of the present invention.

DETAILED DESCRIPTION

The following description is of certain exemplary embodiments of the present invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without limiting or diminishing the scope of the invention as set forth herein. It should be appreciated that the description herein may be adapted to be employed with alternatively configured devices having different shapes, components, materials and the like and still fall within the scope of the present invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the system (and components of the individual operating components of the system) may not be described in detail herein. It should be noted that many alternative or additional functional relationships or physical connections may be present in a practical system.

With reference to FIG. 1, a block diagram of one exemplary embodiment of a system 100 to facilitate the deployment and troubleshooting of IP enabled POS terminals 110. POS terminal 110 may be any device, software, and/or component(s) suitably configured to facilitate a commercial transaction between a merchant and a customer utilizing a transaction instrument (e.g., credit card, debit card, charge card, smart card, and the like). Thus, POS terminal 110 may be any POS terminal known in the art or developed in the future. In accordance with an aspect of one exemplary embodiment of the invention, POS terminal 110 is an Optimum T4100 terminal manufactured by Hypercom Corporation of Phoenix, Ariz., although any POS terminal manufactured by Hypercom Corporation is certainly contemplated by the invention.

POS terminal 110, according to various embodiments of the invention, includes a transaction instrument reader (e.g., magnetic stripe reader, a smart card reader, a radio frequency reader, and the like); various electronic circuits for processing a commercial transaction; a housing for the POS terminal; and user interface components including one or more of the following: a display for presenting and/or receiving transaction information; and a keypad including numeric, alphanumeric, and/or function keys. POS terminal 110 may be used with any number of transaction instruments, and thus, may provide for interchangeable or supplemental transaction instrument interfaces. For example, in one embodiment, a magnetic stripe reader module may be detached from POS terminal 110 housing and a smart card reader module attached to the housing in its place. Wireless capabilities may also be incorporated into POS terminal 110 to provide portability. Periphery devices for use with POS terminal 110 may include printers, additional displays, personal identification number (PIN) entry pads, alphanumeric keyboards, voice prompt systems, signature capture devices, bar code reader, and biometric reader. Furthermore, POS terminal 110 may be a stand alone unit or may be integrated into an electronic cash register (ECR), a vending machine, a self check-out kiosk, and the like.

In addition, POS terminal 110 includes a terminal identifier such that POS terminal 110 may be identified as the POS terminal that made a purchase when a user utilizes POS terminal 110 to purchase applications. In accordance with an aspect of one exemplary embodiment, the terminal identifier may be a serial number assigned to POS terminal 110 that is unique across multiple POS terminal populations (i.e., industries). in another aspect of the invention, the terminal identifier may be a digital signature that POS terminal 110 utilizes to identify itself when downloading and/or purchasing applications and/or demonstration applications.

Furthermore, POS terminal 110 can be used in conjunction with any type of personal computer, network computer, workstation, minicomputer, mainframe, or the like running any operating system such as any version of Windows, Windows XP, Windows NT, Windows 2000, Windows 98, Windows 95, MacOS, OS/2, BeOS, Linux, UNIX, Solaris, or the like. Moreover, although the invention is implemented with TCP/IP (Transmission Control Protocol/Internet Protocol) or Point-to-Point Protocol (PPP) communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein.

POS terminal 110, in one exemplary embodiment, is connected to an Ethernet device 120 via a network connection 115, wherein network connection 115 may be any software and/or hardware component(s) suitably configured to facilitate electronic communications between POS terminal 110 and device 120. Exemplary devices 125 include Ethernet devices such as a router, hub, switch, modem, cable modem, or other similar devices. In accordance with other embodiments of the present invention, other types of networks and devices may be used to connect to POS terminal 110.

In accordance with one embodiment of the present invention, Internet Service Provider (ISP) 130 facilitates access to the Internet 140 via communication channels 125. Exemplary networks or communication channels 125 include, but are certainly not limited to, a telephone network (i.e., dial-up network), an extranet, an intranet, the Internet, online communications, satellite communications, off-line communications, wireless communications, transponder communications, a local area network (LAN), a wide area network (WAN), networked or linked devices, and/or any suitable communication or data input modality.

In the illustrated implementation, network 140 is embodied as the Internet and is presumed to be insecure and open to eavesdroppers. In this context, POS terminal 110 and/or any computing devices (e.g., Ethernet device 120) may or may not be connected to the Internet at all times. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997), all of which are hereby incorporated by reference.

System 100, in one exemplary embodiment, also includes a central or host computer 150 that is connected to network 140. Host computer 150 may be any computing device and/or system that facilitates the processing and authorization of a transaction that is initiated at POS terminal 110. Host computer 150 may be in the form of a network computer, a workstation, a server, a minicomputer, a mainframe computer, a personal computer, a laptop, a notebook, a hand held computer, a set-top box, and the like. Host computer 150 may include other servers or other computing systems including a processor for processing digital data, a memory connected to the processor for storing digital data, an input digitizer connected to the processor for inputting digital data, an application program stored in the memory and accessible by the processor for directing processing of digital data by the processor, a display connected to the processor and memory for displaying information derived from digital data processed by the processor, and one or more databases, each database suitably including client data, merchant data, host institution data, and/or like data that could be used in association with the present invention. As those skilled in the art will appreciate, host computer 150 will typically include an operating system (e.g., Windows XP, NT, 95/98/2000, Linux, Solaris, and the like) as well as various conventional support software and drivers typically associated with computers.

The present invention provides for 'IP Diagnostics' software that is a new and innovative method and system of aiding the deployment and troubleshooting of IP enabled POS terminals. In accordance with one aspect of the present invention, the software identifies and pinpoints where a failure in the IP connection is occurring. The IP Diagnostics application does this by testing, inter alia, major failure points within the IP chain from the POS terminal to a host computer (i.e., a central computer that authorizes and settles sales transactions). With reference to FIG. 2, the IP Diagnostics tests may be performed by executing one or more software applications 210-240, either remotely or at the POS terminal, that are configured to perform one or more of the following tests that test major failure points with the IP chain from the POS terminal to the host computer.

1. Physical Ethernet Connection to a Router or Other Endpoint (210)

In accordance with an embodiment of the present invention, this test checks if the Ethernet cable is properly plugged into POS terminal 110 and another Ethernet device 125. This is the equivalent of checking if the Ethernet connection 'light' turns on when the Ethernet cable is plugged in.

If this test fails, it shows there is a problem with the cable, the cable connection, or the device 125 (i.e., hub, switch or router) that the other end of the cable is connected.

In one embodiment of the present invention, the physical connection test detects the presence of a carrier wave or other electrical signal that is transmitting data on the Ethernet cable.

2. Gateway Test

In accordance with an embodiment of the present invention, this test checks to see if IP traffic can reach the local gateway. The 'gateway' is the first routing point within the IP topology that any Ethernet device will reach. A gateway is a requirement for IP traffic to be routed outside of the local subnet. For POS terminal traffic to reach a host, it must first traverse the gateway.

If this test fails, it shows there is a problem with the router that routes IP traffic outside of the merchant's local environment. This router in some cases is built into the DSL or cable modem, or it can be separate dedicated device dedicated to routing IP traffic.

In one embodiment of the present invention, the gateway test performs a "ping" command to the local gateway such as device 120, wherein the ping originates from POS terminal 110 and uses the local gateway IP address to test whether data can travel from POS terminal 110 to the IP local gateway 120 and back to POS terminal 110. The test will determine if all, some, or none of the data made the round trip between POS terminal 110 and network device 120.

3. DNS Test

In accordance with an embodiment of the present invention, the Domain Name System (DNS) test is a method of testing if IP traffic from POS terminal 110 can reach an external location, such as the merchant's Internet Service Provider (ISP) 130. The DNS server is typically managed by the ISP and is the vehicle by which the name for a host end point is converted into an IP address for use in creating and maintaining a connection with the named server. If IP traffic from POS terminal 110 can reach, and be responded to by the DNS server, then it is known that a good link exists from the merchants terminal to an external point outside their building all the way to their ISP.

If this test fails, it shows there may be a problem with the merchant's Internet Service Provider, or the merchant's connection from their location to their ISP. This can be a DSL or cable modem failure, or an ISP outage.

In accordance with one embodiment of the present invention, this test may be carried out by issuing an ISP request for a well-known domain name, and then waiting for a valid response back from ISP 130.

One advantage of using the DNS protocol is that it typically is allowed to pierce firewalls that may be set up to prevent hacker attacks.

4. Host Test

In accordance with an embodiment of the present invention, the 'Host test' tests the final link in the chain. It tests whether IP traffic can travel from POS terminal 110 to host server 150. It does this by simply attempting to open a transmission control protocol (TCP) connection to the host server's port from the POS terminal. This does not test the functioning of the host, or if the host can respond to a transaction message from the terminal. It simply tests if IP traffic can make a round trip from the terminal to the host.

If this test fails, it shows there is a problem from the ISP to the Internet backbone, or from the host's server to the internet backbone.

The IP Diagnostics performs all of the above listed tests, informs the user where the failure point is located, and provides the user with information on how to solve the problem.

The present invention has been described above with reference to an exemplary embodiment. However, those skilled in the art will recognize that changes and modifications may be made to the exemplary embodiment without departing from the scope of the present invention. For example, the various processing steps dictated by the present invention, as well as the components for carrying out the processing steps, may be implemented in alternate ways depending upon the particular application or in consideration of any number of cost functions associated with the operation of the system. These and other changes or modifications are intended to be included within the scope of the present invention.

What is claimed is:

1. A computer-implemented method to identify where a failure is occurring in an Internet Protocol connection between a point of sale (POS) terminal and a host computer, comprising the steps of:

detecting whether a carrier wave is present on a network cable that is connected to the POS terminal and to a network device;

checking a round trip of data between the POS terminal and the network device;

issuing a request to an Internet service provider that is in communication with the network device, wherein the request comprises a valid domain name; and opening a transmission control protocol connection to the host computer.

2. The computer-implemented method of claim 1, wherein the step of detecting whether a carrier wave is present comprises detecting an electrical signal carrying data on the network cable.

3. The computer-implemented method of claim 1, wherein the step of checking a round trip of data comprises:

sending an echo request packet to the network device, and listening, at the POS terminal, for an echo response reply packet.

4. A computer-implemented method to identify where a failure is occurring in an Internet Protocol connection between a point of sale (POS) terminal and a host computer, comprising the steps of:

successively testing a plurality of failure points, wherein each of the failure points is located in the Internet Protocol connection between the POS terminal and the host computer, wherein the step of successively testing a plurality of failure points comprises initially testing the failure point located closest to the POS terminal along the Internet Protocol connection between the POS terminal and the host computer;

determining whether the failure occurs at one of the plurality of failure points; and identifying the location of the determined failure point.

5. A computer-implemented method to identify where a failure is occurring in an Internet Protocol connection between a point of sale (POS) terminal and a host computer, comprising the steps of:

successively testing a plurality of failure points, wherein each of the failure points is located in the Internet Protocol connection between the POS terminal and the host computer, wherein the step of successively testing a plurality of failure points comprises initially testing the failure point located closest to the POS terminal along the Internet Protocol connection between the POS terminal and the host computer, wherein the step of successively testing a plurality of failure points further comprises consecutively testing each failure point, wherein each successive test is for the untested failure point located closest to the POS terminal along the Internet Protocol connection between the POS terminal and the host computer;

determining whether the failure occurs at one of the plurality of failure points; and identifying the location of the determined failure point.

* * * * *